(12) United States Patent
Fenney

(10) Patent No.: US 10,102,181 B2
(45) Date of Patent: Oct. 16, 2018

(54) EFFICIENT CATMULL-ROM INTERPOLATION

(71) Applicant: Imagination Technologies Limited, Kings Langley (GB)

(72) Inventor: Simon Fenney, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/909,671

(22) Filed: Mar. 1, 2018

(65) Prior Publication Data

US 2018/0189241 A1 Jul. 5, 2018

Related U.S. Application Data

(63) Continuation of application No. 14/835,971, filed on Aug. 26, 2015, now Pat. No. 9,946,688.

(30) Foreign Application Priority Data

Aug. 27, 2014 (GB) .................................. 1415144.3

(51) Int. Cl.
G06F 17/17 (2006.01)
(52) U.S. Cl.
CPC .................................. *G06F 17/175* (2013.01)
(58) Field of Classification Search
None
See application file for complete search history.

(56) References Cited

U.S. PATENT DOCUMENTS 4,631,750 A * 12/1986 Gabriel ..................... G06T 3/40
348/580
5,125,042 A 6/1992 Kerr et al.
(Continued)

FOREIGN PATENT DOCUMENTS

GB 2343579 A 5/2000

OTHER PUBLICATIONS

Foley et al., "Computer Graphics Principles and Practice," pp. 510-511, Addison-Wesley Publishing Company 1995.
(Continued)

*Primary Examiner* — Michael D. Yaary
(74) *Attorney, Agent, or Firm* — Vorys, Sater, Seymour and Pease LLP; Vincent M DeLuca

(57) ABSTRACT

Interpolation logic described herein provides a good approximation to a bicubic interpolation, which is generally smoother than bilinear interpolation, without performing all the calculations normally needed for a bicubic interpolation. This allows an approximation of smooth bicubic interpolation to be performed on devices (e.g. mobile devices) which have limited processing resources. At each of a set of predetermined interpolation positions within an array of data points, a set of predetermined weights represent a bicubic interpolation which can be applied to the data points. For a plurality of the predetermined interpolation positions which surround the sampling position, the corresponding sets of predetermined weights and the data points are used to determine a plurality of surrounding interpolated values which represent results of performing the bicubic interpolation at the surrounding predetermined interpolation positions. A linear interpolation is then performed on the surrounding interpolated values to determine an interpolated value at the sampling position.

20 Claims, 10 Drawing Sheets

(56) References Cited

U.S. PATENT DOCUMENTS

| | | | |
|---|---|---|---|
| 6,989,843 B2* | 1/2006 | Naegle | G06F 7/509 |
| | | | 345/643 |
| 2003/0053687 A1 | 3/2003 | Bao et al. | |
| 2004/0103132 A1 | 5/2004 | Zakrzewski | |
| 2005/0203982 A1 | 9/2005 | Kolibal | |
| 2005/0283516 A1* | 12/2005 | Fenney | G06F 1/0356 |
| | | | 708/495 |

OTHER PUBLICATIONS

Mitchell et al., "Reconstruction Filters in Computer Graphics," Computer Graphics, pp. 221-228, vol. 22, No. 4, Aug. 1988.

* cited by examiner

EFFICIENT CATMULL-ROM INTERPOLATION

BACKGROUND

There are many situations in which it may be useful to perform interpolation on an array of data points to thereby determine an interpolated value at a sampling position within the array. In general, an array of data points may be an n-dimensional array where n≥1. For example, in graphics processing systems a two dimensional (2D) array of texels can be stored to describe a texture, and when the texture is to be applied at a pixel position of an image, the pixel position might not correspond exactly with the position of a texel in the texture, so an interpolated value of the texture at the pixel position (i.e. at a sampling position) is desired. As another example, a 2D array of pixels may represent an image, and if the image is to be scaled then the new pixel positions might not correspond exactly with the positions of original pixels in the image, so interpolated values at the new pixel positions (i.e. at sampling positions) are desired. FIG. 1 shows an example of part of a 2D array 100 of data points 102. FIG. 1 shows a 4×4 set of the data points 102 of the array 100, and as an example two parameters (U and V) describe a sampling position 106 within a region 104 for which an interpolation can be performed.

Interpolation can be performed in a number of different ways. Piecewise linear interpolation is an example of a 1D interpolation method which is simple to implement. An example of linear interpolation is shown in FIG. 2a in which an interpolated value can be determined at a sampling position between two data points A and B. A straight line 202 between the data points A and B shows the interpolated values at sampling positions between the data points A and B. The sampling position is given by the parameter, u, where $0 \leq u \leq 1$, such that the interpolated value $I_u$ at the sampling position is given by a weighted sum: $I_u=(1-u)A+uB$.

Bilinear interpolation is an example of a 2D interpolation method which extends the concept of linear interpolation into two dimensions. An example of bilinear interpolation is shown in FIG. 2b in which an interpolated value can be determined at a sampling position 208 within a square of four surrounding data points $204_1$, $204_2$, $204_3$ and $204_4$. The sampling position 208 is given by two parameters (U and V). When confronted with a multi-dimensional interpolation, one approach is to reduce the dimensionality of the problem, e.g. by performing a separate 1D interpolation for each of the rows, and then performing a 1D interpolation over those results. For example, a linear interpolation can be performed between the data points $204_1$ and $204_2$, using the parameter U, to determine the intermediate interpolated value $206_1$. Similarly, a linear interpolation can be performed between the data points $204_3$ and $204_4$, using the parameter U, to determine the intermediate interpolated value $206_2$. Then a linear interpolation can be performed between the intermediate interpolated values $206_1$ and $206_2$, using the parameter V, to determine the interpolated value 208 at the sampling position given by (U,V). The three linear interpolations described in this bilinear interpolation method can be performed in the same way as the linear interpolation described above with reference to FIG. 2a. An example of reducing the dimensionality of a multi-dimensional filtering problem is described in Mitchell and Netravali's 1988 SIGGRAPH paper "Reconstruction Filters in Computer Graphics", which explains that image reconstruction takes place in two dimensions and involves the convolution of a 2D lattice of samples with a filter k(x,y). Separable filters are considered, where the samples are convolved with the product k(x)k(y). The Mitchell and Netravali paper describes that separable filters are computationally more efficient than nonseparable filters because the filtering operation can be performed in separate passes vertically and horizontally.

Bilinear interpolation can be implemented in a simple manner in hardware, e.g. using some multiply and add (MAD) logic. Furthermore, bilinear interpolation is a fast process which does not consume a large amount of power. Therefore, bilinear interpolation may often be an appropriate choice for interpolation implemented in computer systems which have particularly limited processing power, e.g. in mobile devices such as smart phones, tablets and laptops.

However, linear and bilinear interpolation might not provide smooth interpolated values. In particular, although linear and bilinear interpolation methods will provide interpolated values which are continuous, the first derivative (and higher order derivatives) of the interpolated values is typically not continuous over the data point boundaries. Higher order polynomial interpolation, e.g. quadratic, cubic, quartic, etc-based and their multidimensional variants methods provide smoother interpolated values than the corresponding linear and bilinear interpolation methods. Of particular interest is cubic interpolation as this is the simplest polynomial which can interpolate (i.e. pass through) the control points and where the first derivative of the interpolated values can be continuous over the data point boundaries. Cubic interpolation methods (including multidimensional cubic interpolation methods such as bicubic interpolation methods) match interpolated values and the first derivative of the interpolated values over data point boundaries. However, cubic interpolation methods are more complex to implement than linear interpolation methods (including the corresponding multidimensional linear interpolation methods such as bilinear interpolation methods). Some reasons for this are that cubic interpolation uses twice as many data points in each dimension of the array compared to linear interpolation (and thus bicubic requires 4× as many data points as bilinear interpolation), and cubic interpolation comprises computing third degree polynomials for a sampling position within the array. Therefore, as an example, bicubic interpolation may be chosen over bilinear interpolation when computation speed is not an issue. A person skilled in the art will be aware that there are many types of control-point based cubic curves, including Bezier, Hermite and BSpline, and although each can be mapped into each other by taking linear combinations of the control/sampling points (e.g. see "Computer Graphics Principles and Practice", Second Edition, pp 510 and 511 by Foley, van Dam et al) and, in a broad sense, are equivalent, one of particular interest is the Catmull-Rom spline. This has the useful property that if the sampling position lies exactly on a data point (e.g. if U=0 or U=1) then the interpolated value equals the value of the data point. Further, as described below, when neighbouring curves share three sample points then the curves are also C1 continuous, i.e. the first derivatives of the curves are continuous.

An example of 1D cubic interpolation is shown in FIG. 3a in which four data points (A to D) are used to determine an interpolated value ($I_u$) at a sampling position between the two central data points B and C. A line 302 shows the interpolated values, and it can be seen that the line 302 passes through the data points B&C and that the gradient of the line 302 (i.e. the first derivative of the line 302) is continuous with the neighbouring piecewise segments, $302_{AB}$ and $302_{CD}$, at the curve boundaries. The sampling position is given by the parameter, u, for the region $0 \leq u \leq 1$.

As described above, the interpolated value $I_u$ can be found according to a third degree polynomial which takes the parameter u and the four data points (A to D) as inputs.

Bicubic interpolation is an example of a 2D interpolation method which extends the concept of cubic interpolation into two dimensions. An example of bicubic interpolation is shown in FIG. 3b in which an interpolated value can be determined at a sampling position 308 within a 2×2 square of data points $304_{22}$, $304_{23}$, $304_{32}$ and $304_{33}$ using the values of the data points $304_{11}$ to $304_{44}$. The sampling position 308 is given by two parameters (U and V). In this example, a cubic interpolation can be performed separately for each of the four rows of data points (e.g. data points $304_{x1}$ to $304_{x4}$ for row x), using the parameter U, to determine a respective intermediate interpolated value $306_x$. In this way the dimensionality of the interpolation computation has been reduced. Then a cubic interpolation can be performed over the four intermediate interpolated values $306_1$ to $306_4$, using the parameter V, to determine the interpolated value 308 at the sampling position given by (U,V). Each of the five cubic interpolations described in this bicubic interpolation method can be performed in the same way as the cubic interpolation described above with reference to FIG. 3a.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of determining an interpolated value at a sampling position within an array of data points, wherein at each of a set of predetermined interpolation positions within the array a set of predetermined weights represent a not linear interpolation which can be applied to a plurality of the data points, the method comprising: for a plurality of the predetermined interpolation positions which surround the sampling position, using the corresponding sets of predetermined weights and the plurality of the data points to determine a plurality of surrounding interpolated values which represent results of performing said not linear interpolation at the surrounding predetermined interpolation positions; and performing a linear interpolation on the plurality of surrounding interpolated values to determine an interpolated value at the sampling position. For example, said not linear interpolation may be a cubic interpolation, such as a Catmull-Rom spline.

The array may be an n-dimensional array, and the surrounding predetermined interpolation positions may be the $2^n$ of the predetermined interpolation positions which are closest to the sampling position. As an example, n=2 and the linear interpolation is a bilinear interpolation. In this example, said plurality of data points comprises a 4×4 set of data points, and the sampling position is described by two parameters, and said using the corresponding sets of predetermined weights and the plurality of the data points to determine the plurality of surrounding interpolated values comprises: for each of the lines of the 4×4 set of data points in a first dimension (e.g. rows or columns), determining first and second intermediate interpolated values either side of a first component of the sampling position in the first dimension indicated by a first of the two parameters; using the first intermediate interpolated values from the four lines in the first dimension to determine first and second surrounding interpolated values either side of a second component of the sampling position in a second dimension indicated by a second of the two parameters; and using the second intermediate interpolated values from the four lines in the first dimension to determine third and fourth surrounding interpolated values either side of the second component of the sampling position in the second dimension indicated by the second of the two parameters. For example, either: (i) the lines in the first dimension are rows of the 4×4 set of data points and lines in the second dimension are columns of the 4×4 set of data points, or (ii) the lines in the first dimension are columns of the 4×4 set of data points and lines in the second dimension are rows of the 4×4 set of data points.

There is provided interpolation logic configured to determine an interpolated value at a sampling position within an array of data points, wherein at each of a set of predetermined interpolation positions within the array a set of predetermined weights represent a not linear interpolation which can be applied to a plurality of the data points, the interpolation logic comprising: a not linear interpolation unit configured to, for a plurality of the predetermined interpolation positions which surround the sampling position, use the corresponding sets of predetermined weights and the plurality of the data points to determine a plurality of surrounding interpolated values which represent results of performing said not linear interpolation at the surrounding predetermined interpolation positions; and a linear interpolation unit configured to perform a linear interpolation on the plurality of surrounding interpolated values to determine an interpolated value at the sampling position.

There may be provided computer readable code adapted to perform the steps of any of the methods described herein when the code is run on a computer. Furthermore, there may be provided computer readable code for generating interpolation logic according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
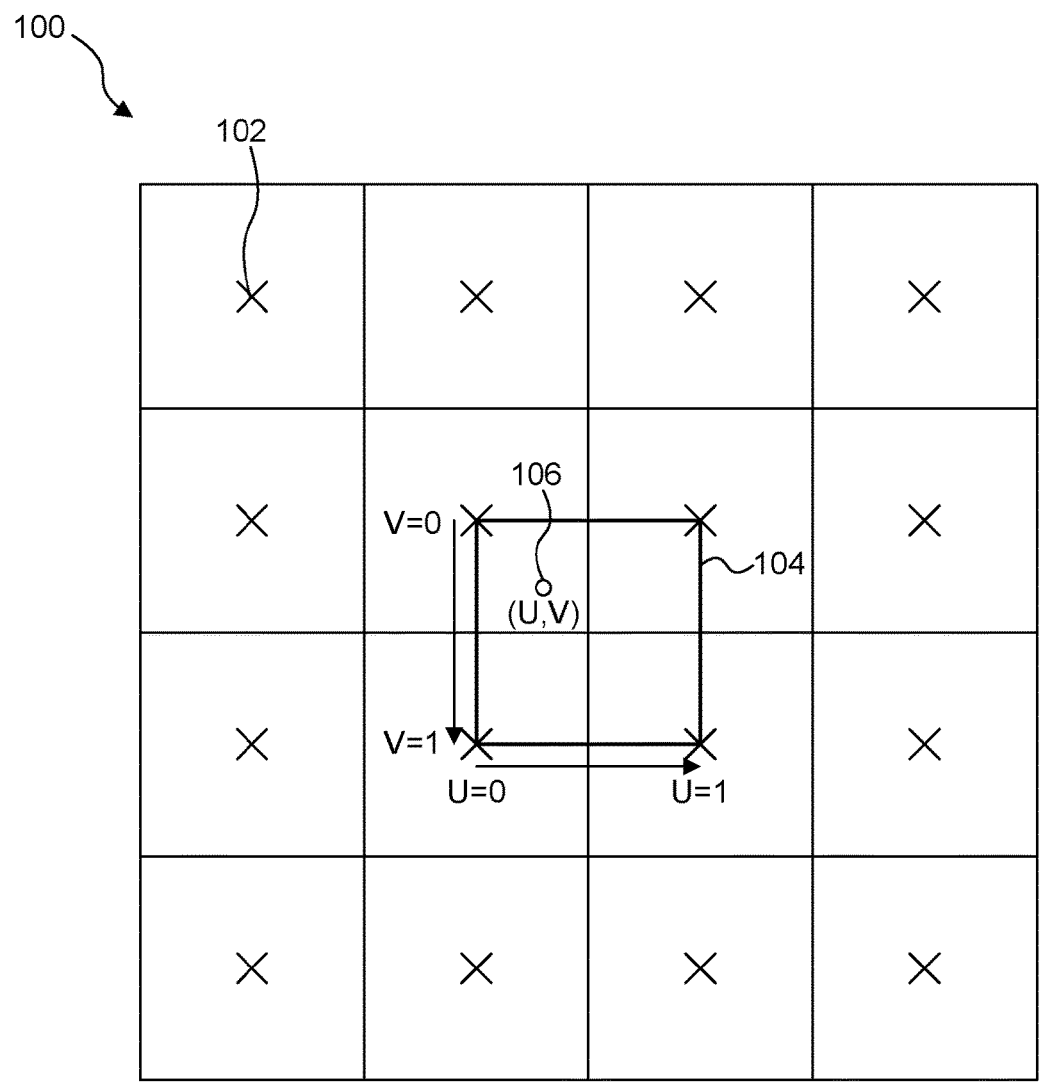
FIG. 1 shows a 4×4 set of data points of an array and a sampling position within the array.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Interpolation logic is described in examples herein which provides interpolated values which are very similar to the interpolated values provided by a full cubic (or bicubic) interpolation, but which is less complex to implement, e.g. uses less processing resources and/or is faster to execute. This allows interpolation to be performed which provides similar results to cubic (or bicubic) interpolation even on computer systems which have limited processing resources, such as on mobile devices, e.g. smart phones, tablets or laptops, which would typically not be capable of performing a full cubic (bicubic) interpolation. The techniques may be used for interpolation functions other than cubic interpolation functions, e.g. for non-polynomial interpolations such as a Mitchell-Netravali interpolation or an arbitrary smooth interpolation.

In particular, for each of a set of predetermined interpolation positions within an array of data points, a set of predetermined weights represent a cubic interpolation which can be applied to a plurality of the data points within the array. That is, a set of weights is predetermined which can be used, e.g. to perform a weighted sum on some of the data points, to determine interpolated values at particular interpolation positions in the array. When an interpolated value is desired at a sampling position then interpolated values may be determined at a plurality of the predetermined interpolation positions which surround the sampling position, and those surrounding interpolated values can then be passed to a linear interpolation unit. The linear interpolation of the surrounding interpolated values provides an interpolated value at the sampling position which is approximately equal to the interpolated value that would be provided by a full cubic interpolation. The principle of determining the surrounding interpolated values at predetermined interpolation positions which surround the sampling position and then performing a linear interpolation on the surrounding interpolated values can be implemented in different ways in different examples, some of which are described below. If a sampling position at which an interpolated value is desired falls on one of the predetermined interpolation positions then, in some examples, the predetermined weights for that interpolation position can be used to determine the interpolated value; however, in other examples, four interpolated values are still passed to the linear interpolation unit for determining the interpolated value at the sampling position because the cost of passing the four interpolated values to the linear interpolation unit may be lower than the cost of treating this situation as a special case.

Figure 4A:
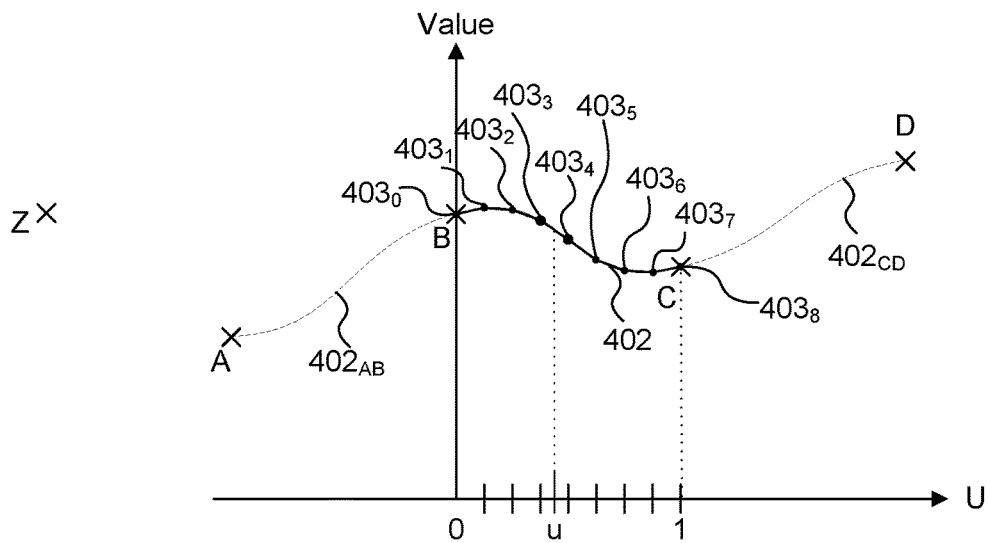
FIG. 4a shows a set of predetermined interpolation positions for a cubic interpolation method in accordance with examples described herein.

An example of approximating a 1D cubic interpolation is shown in FIG. 4a in which four data points (A to D) are used to determine an interpolated value at a sampling position, given by the parameter u, between the two central data points B and C. A line 402 shows the result of a full cubic interpolation of the four data points. In this example the cubic interpolation is a Catmull-Rom spline, but in other examples other cubic interpolation methods could be used, such as a Bezier curve or a uniform B-spline. It can be seen that (for the Catmull-Rom spline) the line 402 passes through the data points C&B and that the gradient of the line 402 (i.e. the first derivative of the line 402) is continuous with the neighbouring piecewise segments, $402_{AB}$ and $402_{CD}$, at the curve boundaries. A set of interpolation positions ($403_0$ to $403_8$) are shown in FIG. 4a. The interpolation positions 403 divide the region between the data points B and C into eight sections. In other examples, there may be a different number of interpolation positions which divide a region between adjacent data points of the array into N sections, where N≥2. At each of the interpolation positions 403, a set of predetermined weights is stored which can be applied to the data points A, B, C and D for performing a weighted sum to thereby determine an interpolated value representing the result of performing the cubic interpolation at the interpolation position. For the Catmull-Rom spline, it can be trivially seen that for interpolation position $403_0$ the weights for data points A, C and D will be zero and the weight for data point B will be one so that the if the sampling position falls exactly on data point B then the value of data point B is returned (but it is noted that this may not be the case for other interpolation (cubic or otherwise) functions). Similarly, it can be trivially seen that for interpolation position $403_8$ the weights for data points A, B and D will be zero and the weight for data point C will be one so that the if the sampling position falls exactly on data point C then the value of data point C is returned. The weights for the other predetermined interpolation positions ($403_1$ to $403_7$) are less trivial and will depend upon the particular interpolation that is being represented (e.g. a Catmull-Rom interpolation or some other interpolation such as a uniform B-spline). Examples of the weights for the other predetermined interpolation positions ($403_1$ to $403_7$) are given in examples described below which relate to a Catmull-Rom spline, but for other interpolation schemes (e.g. uniform B-splines) different weights may be used, as would be apparent to a person skilled in the art.

Figure 2A:
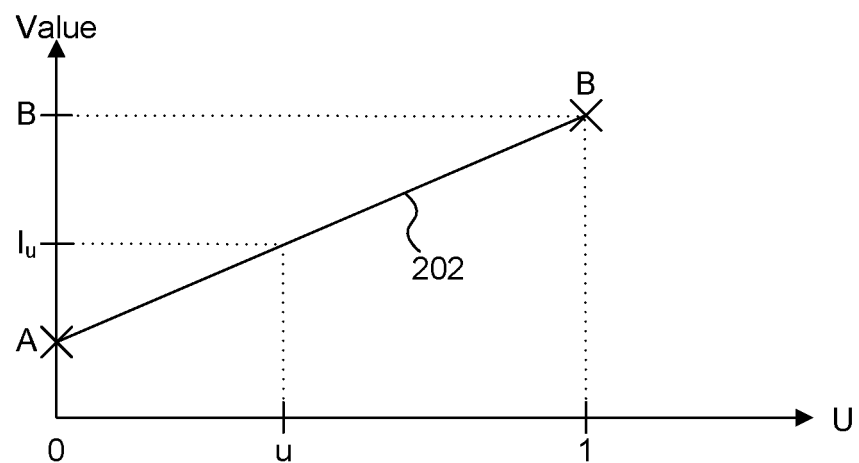
FIG. 2a represents an example of linear interpolation.

A sampling position, given by the parameter u, is shown in FIG. 4a which is not the same as any of the predetermined interpolation positions 403. In this case interpolated values are determined at two of the predetermined interpolation positions $403_3$ and $403_4$ which surround the sampling position. The surrounding interpolation positions $403_3$ and $403_4$ are the two closest of the predetermined interpolation positions 403 to the sampling position. The surrounding interpolated values at the interpolation positions $403_3$ and $403_4$ are passed to a linear interpolation unit which then performs a linear interpolation using the surrounding interpolated values (e.g. using the linear interpolation principles illustrated in FIG. 2a) to determine an interpolated value at the sampling position, u.

The predetermined weights are used to determine interpolated values at the predetermined interpolation positions 403 by performing weighted sums of the data points A, B, C and D. This does not involve any third degree polynomial calculations, and allows the interpolated values to be determined at the predetermined interpolation positions in a very simple manner, e.g. just involving MAD (multiply and add) operations which are very simple and fast to implement in hardware. Increasing the number of predetermined interpolation positions will increase the accuracy of the final interpolated value but will require a greater number of weights to be stored and a greater number of bits defining the sampling position to thereby identify which of the predetermined interpolation positions are the closest to the sampling position. Using nine predetermined interpolation positions 403 (i.e. so the region between the data points B and C is divided into eight sections) as shown in FIG. 4a appears to provide a good trade-off between the accuracy of the interpolated values and the amount of data stored for the predetermined weights and the number of bits of the parameter u used to define the sampling position. However, in other examples a different number of predetermined interpolation positions may be used. The error of piecewise linear interpolation rapidly decreases as the number of subdivisions in the piecewise linear interpolation increases.

FIG. 4a shows a 1D example, in which interpolation is performed on a 1-dimensional array of data points and in which there are two surrounding interpolation positions ($403_3$ and $403_4$). More generally, the principles may be extended to examples in which interpolation is performed on an n-dimensional array of data points (where n≥1), and in that case the surrounding predetermined interpolation positions are the $2^n$ of the predetermined interpolation positions which are closest to the sampling position.

Figure 4B:
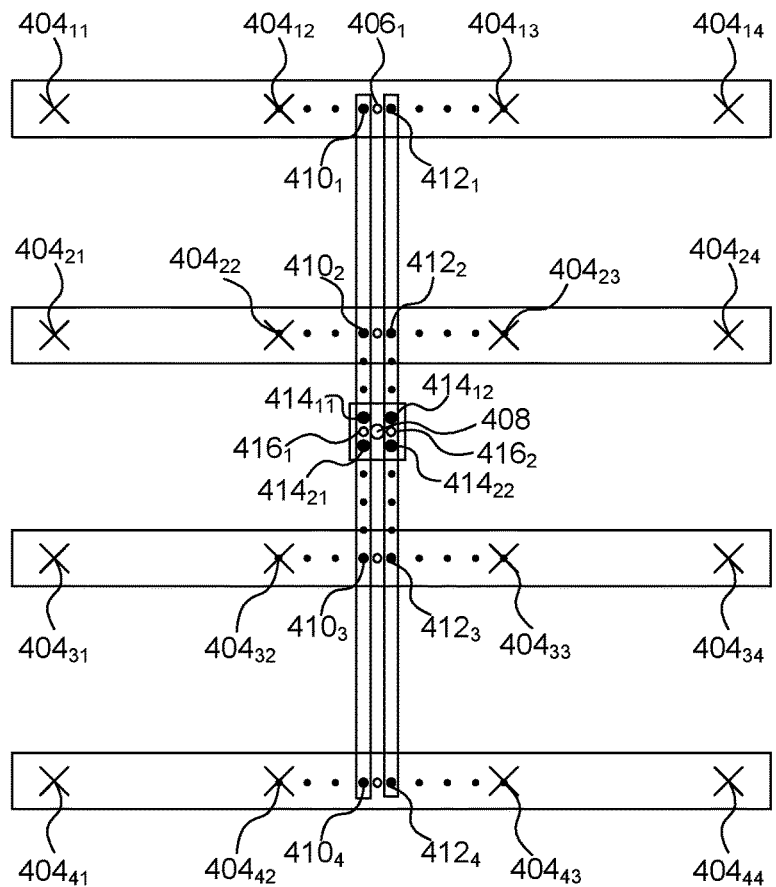
FIG. 4b shows a set of predetermined interpolation positions for a bicubic interpolation method in accordance with examples described herein.

For example, FIG. 4b shows an example in which interpolation is performed on a 2D array of data points. In this example, an interpolated value is to be determined at a sampling position 408 within a 4×4 square of data points $404_{11}$ to $404_{44}$. In other examples, a different arrangement of data points (i.e. not 4×4) may be used to determine an interpolated value at a sampling position. The sampling position 408 is given by two parameters (U and V) which define the position of the sampling position 408 in the central region between the data points $404_{22}$, $404_{23}$, $404_{32}$ and $404_{33}$. In this example, interpolated values are determined at four predetermined interpolation positions $414_{11}$, $414_{12}$, $414_{21}$ and $414_{22}$ which surround the sampling position 408. In order to do this, interpolated values are determined at two of the predetermined interpolation positions either side of the row component of the sampling position (given by the parameter U, and shown in FIG. 4b for the first row by the reference $406_1$) separately for each of the four rows of data points (e.g. data points $404_{x1}$ to $404_{x4}$ for row x) in a similar manner to that described above with reference to FIG. 4a. In this way, for each row, a first intermediate interpolated value 410 is determined and a second intermediate interpolated value 412 is determined. In the example shown in FIG. 4b, the first intermediate interpolated value 410 is to the left of the U component of the sampling position 406 and the second intermediate interpolated value 412 is to the right of the U component of the sampling position 406. The first and second intermediate interpolated values for a row are the closest two of the predetermined interpolated values for that row to the U component of the sampling position 406.

Then the first intermediate interpolated values from the four rows ($410_1$, $410_2$, $410_3$ and $410_4$) are used and a similar method to that described above with reference to FIG. 4a is implemented to determine two surrounding interpolated values at predetermined interpolation positions $414_{11}$ and $414_{21}$ either side of the column component of the sampling position (given by the parameter V, and shown in FIG. 4b by the reference $416_1$). Similarly, the second intermediate interpolated values from the four rows ($412_1$, $410_2$, $410_3$ and $412_4$) are used and a similar method to that described above with reference to FIG. 4a is implemented to determine two surrounding interpolated values at predetermined interpolation positions $414_{12}$ and $414_{22}$ either side of the column component of the sampling position (given by the parameter V, and shown in FIG. 4b by the reference $416_2$). Therefore, a 1D method similar to that described above with reference to FIG. 4a to generate pairs of interpolated values at neighbouring predetermined positions is performed six times in order to determine the four surrounding interpolated values at the surrounding interpolation positions $414_{ii}$, $414_{12}$, $414_{21}$ and $414_{22}$.

Figure 2B:
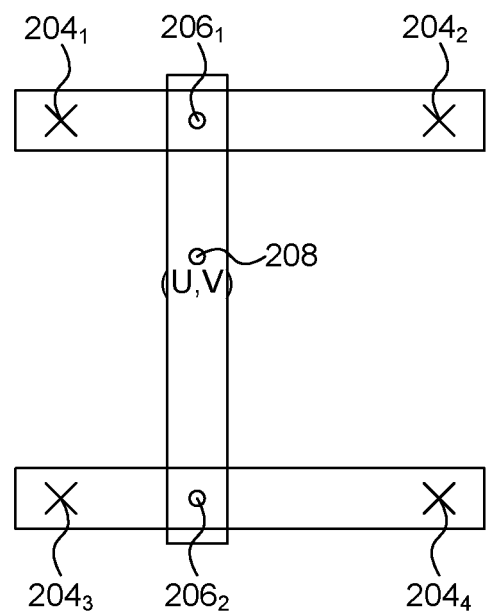
FIG. 2b represents an example of bilinear interpolation.
Figure 3A:
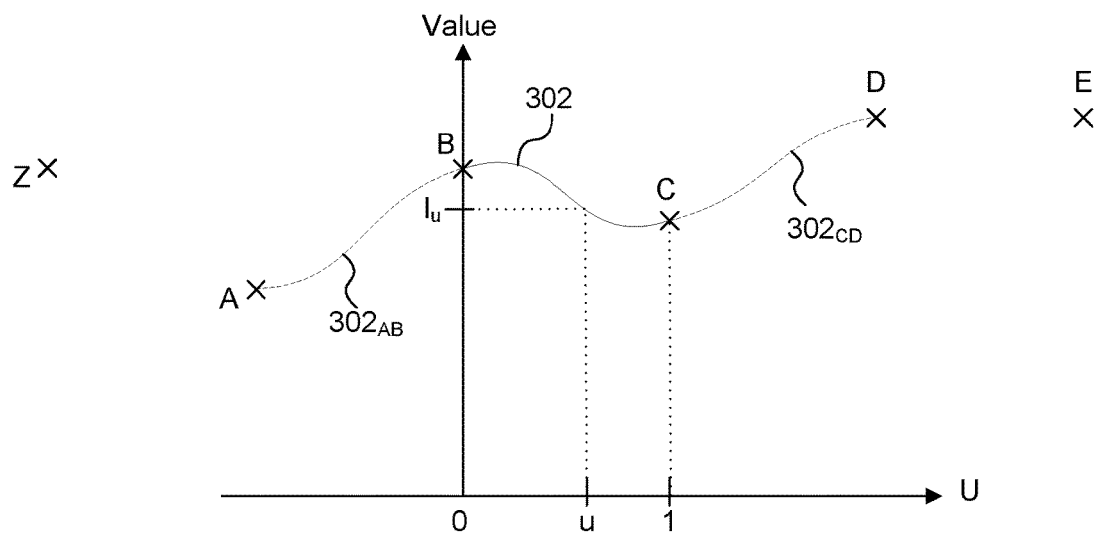
FIG. 3a represents an example of cubic interpolation.
Figure 3B:
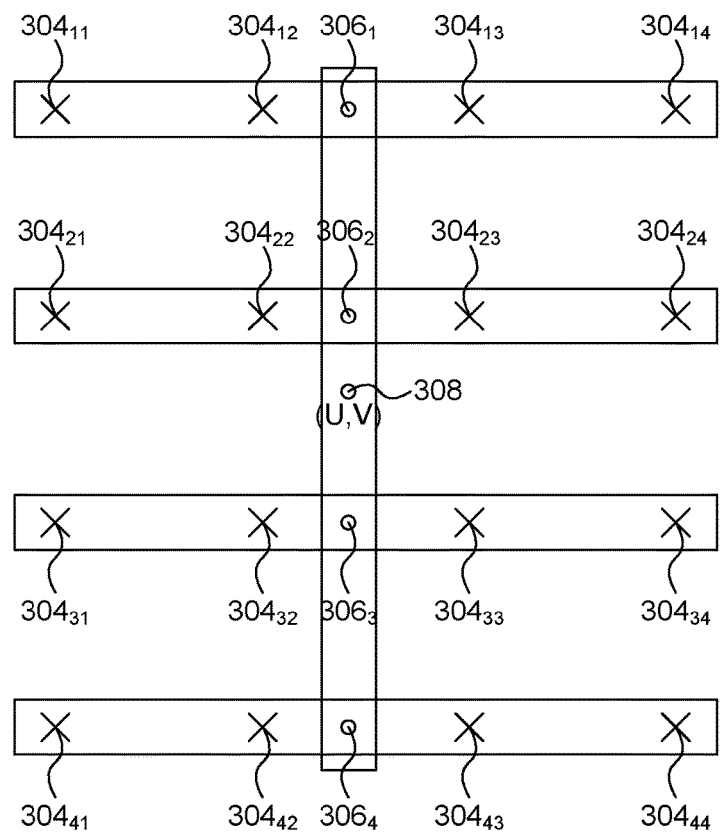
FIG. 3b represents an example of bicubic interpolation.

The surrounding interpolated values at the surrounding interpolation positions $414_{11}$, $414_{12}$, $414_{21}$ and $414_{22}$ are passed to a bilinear interpolation unit which then performs a bilinear interpolation using the surrounding interpolated values (e.g. using the bilinear interpolation principles illustrated in FIG. 2b) to determine an interpolated value at the sampling position 408. In this way, a bicubic interpolation is approximated by six weighted sums (which, given predetermined weights, are simple to implement in MAD logic in hardware) and a bilinear interpolation (which is also simple to implement in MAD logic in hardware). It is noted that a bilinear interpolation unit is likely to be included in a Graphics Processing Unit (GPU) for other purposes, so a bilinear interpolation unit does not normally need to be added solely for the purpose of implementing bicubic interpolation according to the examples described herein. Therefore, the hardware cost of implementing bicubic interpolation according to the examples described herein is low. Furthermore, it is noted that the bilinear interpolation is performed at more arbitrary positions than the determination of the surrounding interpolated values which are determined at the predetermined surrounding interpolation positions $414_{11}$, $414_{12}$, $414_{21}$ and $414_{22}$, using the predetermined weights.

Figure 5:
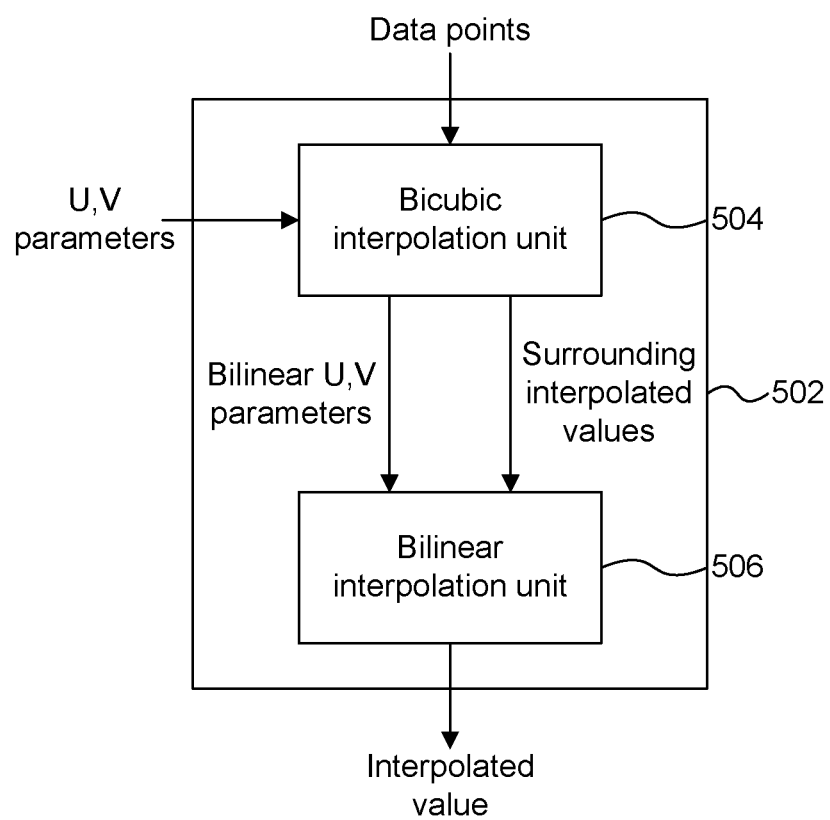
FIG. 5 is a schematic diagram of interpolation logic.

FIG. 5 shows an example of interpolation logic 502 configured to determine an interpolated value at a sampling position within a 2D array of data points in accordance with the examples described herein. The interpolation logic 502 comprises a bicubic interpolation unit 504 and a bilinear interpolation unit 506. In preferred examples, the bicubic and bilinear interpolation units 504 and 506 are implemented in special purpose hardware, as described in more detail below, but in other examples the units 504 and 506 could be implemented in general purpose hardware configured by software, e.g. executed on a processing unit (e.g. a central processing unit (CPU) or a graphics processing unit (GPU)). The bicubic interpolation unit 504 is arranged to receive the array of data points and the parameters (U and V) which define the sampling position within the array at which an interpolated valued is to be determined. The bicubic interpolation unit 504 is configured to use predetermined weights and the data points to determine a plurality of interpolated values at particular predetermined interpolation positions which surround the sampling position and to provide those surrounding interpolated values to the bilinear interpolation unit 506. The bicubic interpolation unit 504 also sends bilinear U and V parameters to the bilinear interpolation unit 506 to describe the position of the sampling position within the surrounding interpolated values. The bilinear interpolation unit 506 is configured to perform a bilinear interpolation on the surrounding interpolated values using the bilinear U and V parameters to determine an interpolated value at the sampling position. Often a computing system will include a bilinear interpolation unit for purposes other than approximating a cubic interpolation according to the methods described herein. The methods described herein make use of the bilinear interpolation unit for approximating a cubic interpolation, so the extra hardware needed for extending the capability of a computing system from being able to perform bilinear interpolation to also being able to approximate bicubic interpolation is very small compared to implementing a separate full bicubic interpolation unit.

Figure 6:
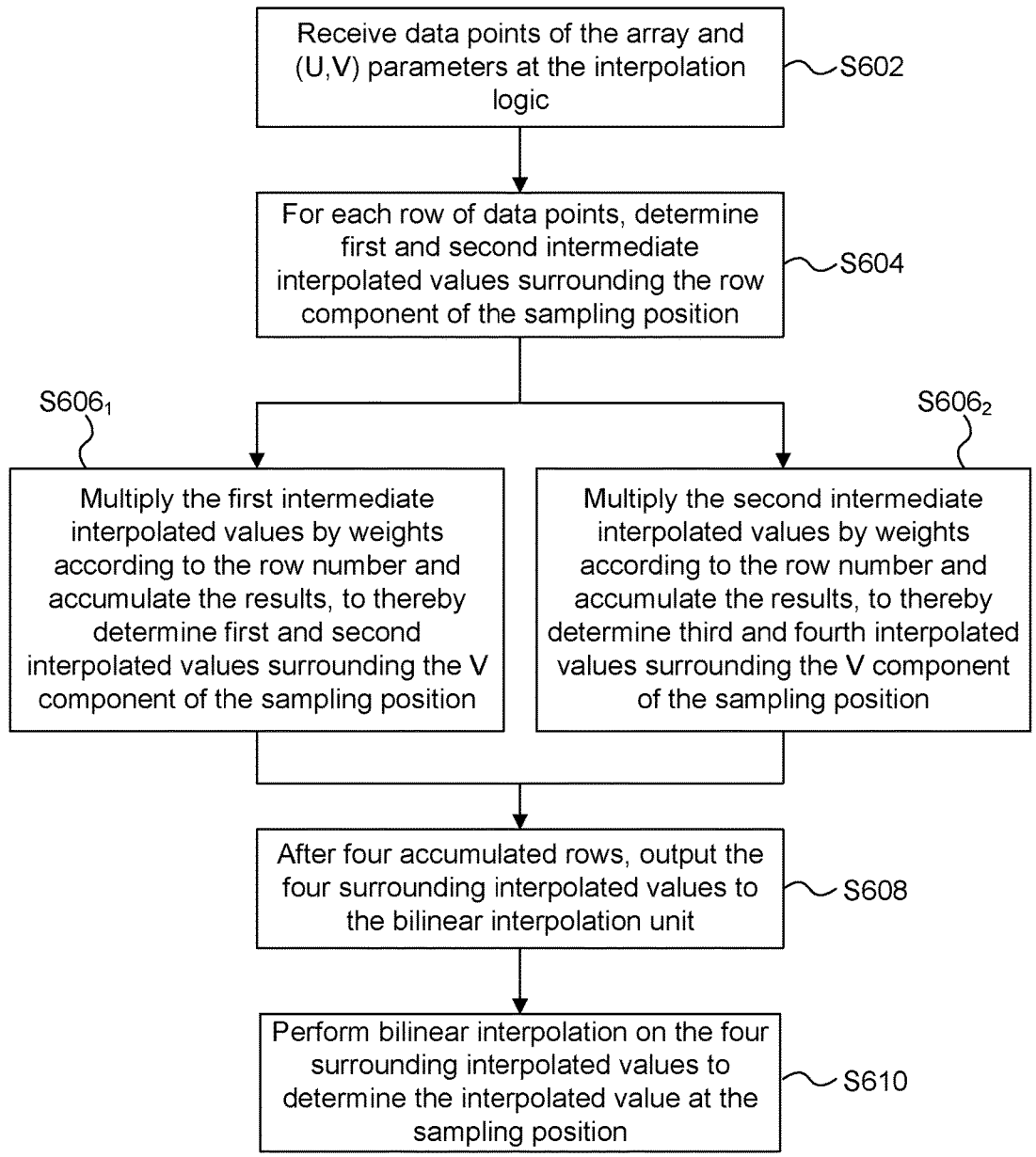
FIG. 6 is a flow chart for a method of determining an interpolated value at a sampling position within an array of data points.

More details of a method of determining an interpolated value at a sampling position (e.g. at position 408) in a 2D array (e.g. as shown in FIG. 4b) are described with reference to the flow chart shown in FIG. 6.

In step S602 data points 404 of the array and the parameters U and V are received at the interpolation logic 502. With reference to FIG. 4b, the U and V parameters describe the position of the sampling position 408 within the region between the four data points $404_{22}$, $404_{23}$, $404_{32}$ and $404_{33}$. The interpolation logic 502 operates to determine an interpolated value for the sampling position 408, as described below.

Figure 7:
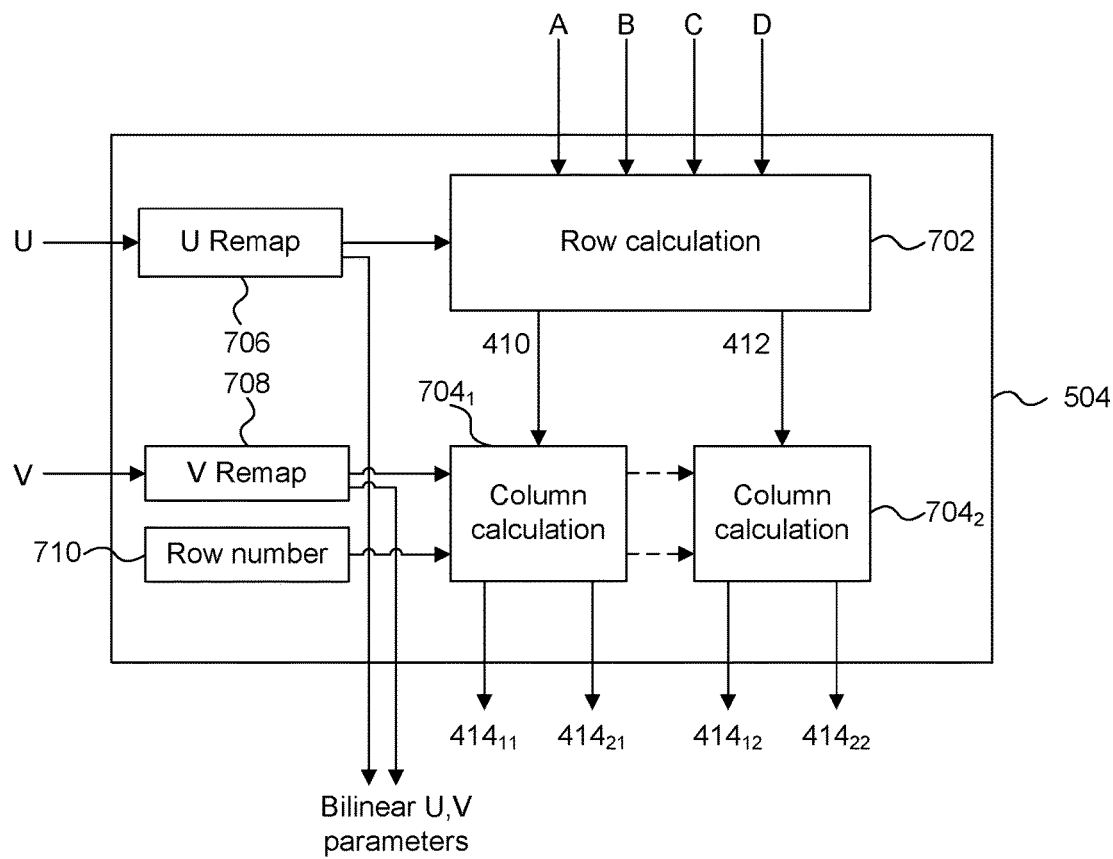
FIG. 7 is a schematic diagram of a bicubic interpolation unit.

FIG. 7 shows a more detailed view of the bicubic interpolation unit 504. The bicubic interpolation unit 504 comprises a row calculation unit 702 (which may be referred to as an "A calculation unit"), two column calculation units $704_1$ and $704_2$ (which may be referred to as "B calculation units"), a U remapping unit 706, a V remapping unit 708, and a row number unit 710. The U remapping unit 706 is arranged to receive the U parameter and to provide a remapped version of the U parameter to the row calculation unit 702, as described in more detail below. The row calculation unit 702 is also arranged to receive a row of four data points (A, B, C and D). The row calculation unit 702 is arranged to provide two intermediate interpolated values 410 and 412 to the respective column calculation units $704_1$ and $704_2$. The V remapping unit 708 is arranged to receive the V parameter and to provide a remapped version of the V parameter to both of the column calculation units 704, as described in more detail below. The row number unit 710 is arranged to provide an indication of the current row number to both of the column calculation units 704, as described in more detail below. The column calculation units output the surrounding interpolated values $414_{11}$, $414_{12}$, $414_{21}$ and $414_{22}$ from the bicubic calculation unit 504 which can be provided to the bilinear calculation unit 506.

In step S604, for each row of data points (A to D), e.g. for data points $404_{11}$, $404_{12}$, $404_{13}$ and $404_{14}$ of the first row shown in FIG. 4b, the row calculation unit 702 determines a first intermediate interpolated value 410 and a second intermediate interpolated value 412 surrounding the row component of the sampling position, given by the remapped U parameter provided from the U remapping unit 706.

Figure 8:
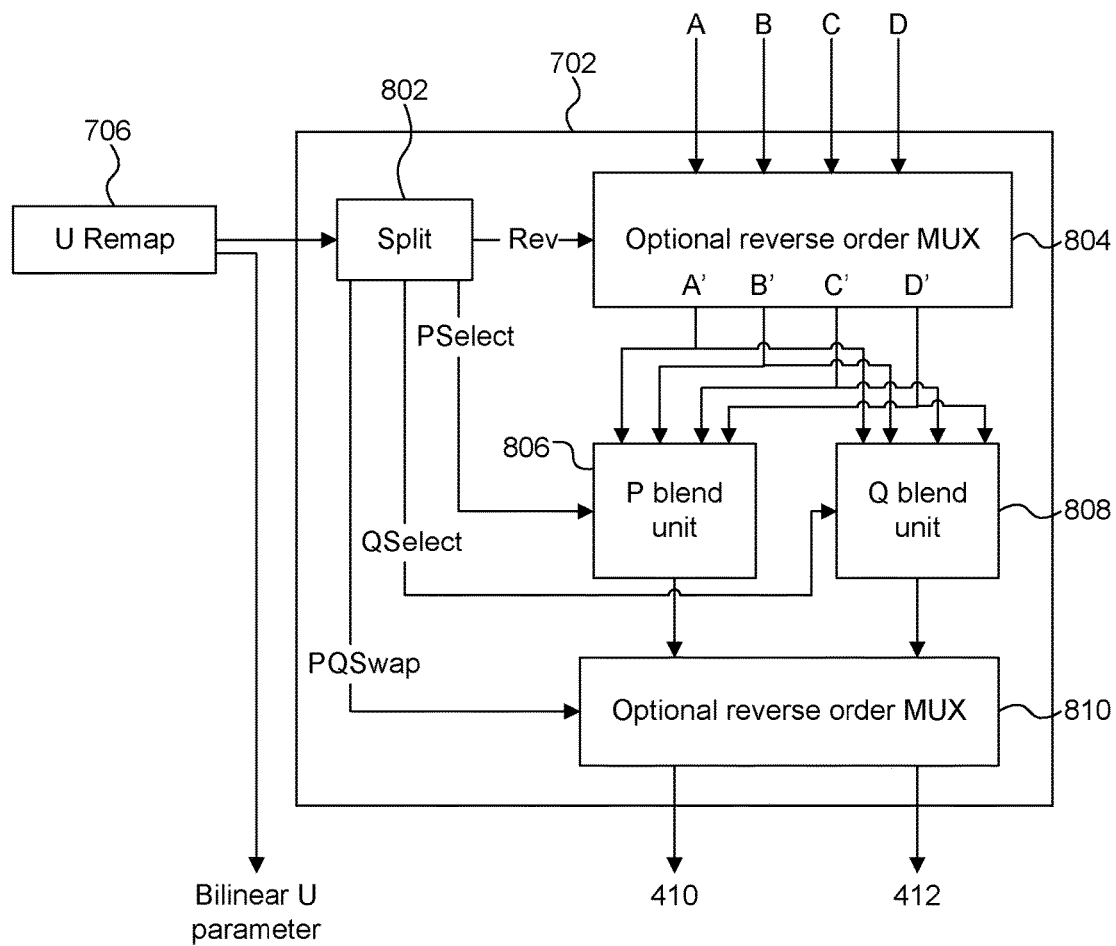
FIG. 8 is a schematic diagram of a row calculation unit.

FIG. 8 shows a more detailed view of the row calculation unit 702. The row calculation unit 702 comprises a splitting unit 802, a first multiplexer 804, a P blend unit 806, a Q blend unit 808 and a second multiplexer 810.

The U remapping unit 706 provides a plurality of bits to the splitting unit 802 based on the bits of the U parameter. For example, the U parameter which describes the row component of the sampling position, may comprise k bits, $\{u_0, u_1 \ldots u_{k-1}\}$, where as an example k may be eleven. The number of bits used for the U parameter determines the resolution at which the sampling position can be defined. The U remapping unit 706 receives the k bits of the U parameter and splits the U parameter into the first m bits which are for use in the row calculation unit 702 and the remaining (k−m) bits are provided from the U remapping unit 706 to indicate a bilinear U parameter. The bilinear interpolation unit 506 uses the bilinear U parameter to perform the bilinear interpolation on the four surrounding interpolated values outputted from the bicubic interpolation unit 504. As an example, m may be three, and those three bits of the U parameter identify which eighth of the whole region between two data points B and C the sampling position is within. In the example shown in FIG. 4a, the row component of the sampling position is between the positions $403_3$ and $403_4$, so the first three bits defining the sampling position will be 011. The U remapping unit 706 determines four control signals: "Rev", "PSelect", "QSelect" and "PQSwap" which control the operation of the row calculation unit 702, and these four control signals are passed to the splitting unit 802. The splitting unit 802 passes the "Rev" signal to the multiplexer 804, passes the "PSelect" signal to the P blend unit 806, passes the "QSelect" signal to the Q blend unit 808 and passes the PQSwap signal to the multiplexer 810. As described in more detail below, most interpolating functions are symmetrical, such that if control points ABCD are swapped to be DCBA, the resulting curve is reflected around u=0.5. Furthermore, it is noted that for any given sampling position u, the surrounding predetermined sampling positions in one dimension will be one even and one odd adjacent sampling positions, hence the even and odd sampling positions can be separated into two distinct sets and treated separately, e.g. in the P and Q blend units 806 and 808.

In an example in which m=3, the Rev, QSelect and PQSwap signals each have one bit and the PSelect signal has two bits. In this example, the U remapping unit 706 sets the "Rev" signal to be equal to the first bit of the U parameter, $u_0$. The U remapping unit 706 sets the "PQSwap" signal to be equal to the third bit of the U parameter, $u_2$. The U remapping unit 706 sets PSelect to be 00 and sets QSelect to be 0 if the first m bits of the U parameter are 000 or 111 (i.e. if the row component of the sampling position is in the first or last of eight sections of the region between the data points B and C); the U remapping unit 706 sets PSelect to be 10 and sets QSelect to be 0 if the first m bits of the U parameter are 001 or 110 (i.e. if the row component of the sampling position is in the second or seventh of eight sections of the region between the data points B and C); the U remapping unit 706 sets PSelect to be 10 and sets QSelect to be 1 if the first m bits of the U parameter are 010 or 101 (i.e. if the row component of the sampling position is in the third or sixth of eight sections of the region between the data points B and C); and the U remapping unit 706 sets PSelect to be 11 and sets QSelect to be 1 if the first m bits of the U parameter are 011 or 100 (i.e. if the row component of the sampling position is in the fourth or fifth of eight sections of the region between the data points B and C).

The Rev signal (which is equal to the first bit of the U parameter) identifies whether the row component of the sampling position is within the first half (when $u_0$=0) or within the second half (when $u_0$=1) of the region between the two data points B and C. The interpolation, e.g. represented by the line 402 in FIG. 4a, is a symmetric function. Therefore, if the sampling position is in the second half of the region between B and C (i.e. if the sampling position is closer to data point C than to data point B) then the inputs A, B, C and D can be reversed by the multiplexer 804. If the inputs are to be swapped then the inputs A and D are swapped and the inputs B and C are swapped. The potentially reversed data points are outputted from the multiplexer as A', B', C' and D' as shown in FIG. 8. This reduces the number of different positions at which an interpolated value may need to be determined, thereby simplifying the hardware of the P blend unit 806 and the Q blend unit 808.

Both the P blend unit 806 and the Q blend unit 808 receive all four of the data points (A', B', C' and D') outputted from the multiplexer 804, and perform weighted sums of the data points to thereby determine intermediate interpolated values (e.g. $410_1$ and $412_1$ shown in FIG. 4b) either side of the row component of the sampling position (e.g. $406_1$). The P blend unit 806 is configured to determine an interpolated value at an even one of the interpolation positions 403. For example, the P blend unit 806 is configured to determine an interpolated value at one of the interpolation positions $403_0$, $403_2$ or $403_4$ in dependence on the PSelect signal received from the splitting unit 802. In the example described above, the first three bits of the U parameter are 011, so PSelect=11 and the P blend unit 806 determines an interpolated value at the interpolation position $412_1$ which is at the half way point between data points B and C (corresponding to position $403_4$ shown in FIG. 4a). If PSelect=10 (which happens when the first m bits of the U parameter are 001 or 010) then the nearest one of the even interpolation positions would be position $403_2$ which is ¼ of the way from data point B to data point C. If PSelect=00 (which happens when the first m bits of the U parameter are 000) then the nearest one of the even interpolation positions would be position $403_0$ which takes the value of the data point B.

Similarly, the Q blend unit 808 is configured to determine an interpolated value at an odd one of the interpolation positions 403. For example, the Q blend unit 808 is configured to determine an interpolated value at one of the interpolation positions $403_1$, $403_3$ in dependence on the QSelect signal received from the splitting unit 802. In the example described above, the first three bits of the U parameter are 011, so QSelect=1 and the Q blend unit 808 determines an interpolated value at the interpolation position $410_1$ which is ⅜ of the way from data point B to data point C (corresponding to position $403_3$ shown in FIG. 4a). If QSelect=0 (which happens when the first m bits of the U parameter are 000 or 001) then the nearest one of the odd interpolation positions would be position $403_1$ which is ⅛ of the way from data point B to data point C.

To implement a full cubic interpolation between the points B and C would require many cubic operations to be performed. However, in the examples described herein, the interpolated value is only determined at the predetermined interpolation positions. For example, an interpolated value at each of the interpolation positions 403 can be determined by performing a weighted sum according to:

$$w_A(u)A' + w_B(u)B' + w_C(u)C' + w_D(u)D' \quad (1)$$

where A', B', C' and D' are the four data points of the row and $w_A$, $w_B$, $w_C$ and $w_D$ are their corresponding weights which are functions of the parameter, u, wherein the values of the weights are predetermined for values of the parameter, u, corresponding to the predetermined interpolation positions.

Table 1 below shows the value of the weights which can be applied to exactly represent a Catmull-Rom interpolation at the nine interpolation positions $403_0$ to $403_8$ shown in FIG. 4a.

TABLE 1 weights for representing a Catmull-Rom interpolation

| U | $w_A$ | $w_B$ | $w_C$ | $w_D$ |
|---|---|---|---|---|
| 0 | 0 | 1 | 0 | 0 |
| 1/8 | −49/1024 | 987/1024 | 93/1024 | −7/1024 |
| 2/8 | −9/128 | 111/128 | 29/128 | −3/128 |
| 3/8 | −7/1024 | 745/1024 | 399/1024 | −45/1024 |
| 4/8 | −1/16 | 9/16 | 9/16 | −1/16 |
| 5/8 | −45/1024 | 399/1024 | 745/1024 | −7/1024 |
| 6/8 | −3/128 | 29/128 | 111/128 | −9/128 |

TABLE 1-continued weights for representing a Catmull-Rom interpolation

| U | $w_A$ | $w_B$ | $w_C$ | $w_D$ |
|---|---|---|---|---|
| 7/8 | −7/1024 | 93/1024 | 987/1024 | −49/1024 |
| 8/8 | 0 | 0 | 1 | 0 |

Although the weights given in Table 1 could be used in the P blend unit 806 and the Q blend unit 808, in preferred examples the weights are set such that they are not a perfect representation of the Catmull-Rom interpolation in order to simplify the hardware of the P blend unit 806 and the Q blend unit 808. Operations which perform multiplication by a predetermined constant are cheaper in general than arbitrary multiplication operations and with careful analysis of the constants, a multiplier unit can combine the constants and provide a cheaper unit (in terms of the amount of hardware needed to implement the multiplier unit and in terms of the speed of performing the multiplication operations) than a general purpose multiplier unit. For example, the weights are adapted slightly from those given in Table 1 such that the weighted sum given by equation 1 is simpler to implement in hardware, e.g. using multiply and add (MAD) logic. For example, Table 2 shows simplified weights which could be used instead of those given in Table 1. The difference between the weights shown in Table 1 and Table 2 is small and is unlikely to result in any perceptual distortion to the final interpolated values, but will significantly simplify the hardware used to perform the weighted sum thereby allowing the interpolation to be performed faster and with less power consumed.

TABLE 2 simplified weights for representing a Catmull-Rom interpolation

| U | $w_A$ | $w_B$ | $w_C$ | $w_D$ |
|---|---|---|---|---|
| 0 | 0 | 1 | 0 | 0 |
| 1/8 | −12/256 | 247/256 | 23/256 | −2/256 |
| 2/8 | −2/32 | 28/32 | 7/32 | −1/32 |
| 3/8 | −18/256 | 186/256 | 100/256 | −12/256 |
| 4/8 | −2/32 | 18/32 | 18/32 | −2/32 |
| 5/8 | −12/256 | 100/256 | 186/256 | −18/256 |
| 6/8 | −1/32 | 7/32 | 28/32 | −2/32 |
| 7/8 | −2/256 | 23/256 | 247/256 | −12/256 |
| 8/8 | 0 | 0 | 1 | 0 |

It can be seen that the even numbered evaluation positions now all use the same denominator (32, which can be implemented as a binary shift of five binary places), as do the odd positions (256, which can be implemented as a binary shift of eight binary places), which is beneficial to hardware cost reduction. Furthermore, it can be seen that for each of the predetermined interpolation positions, the sum of the predetermined weights $w_A$, $w_B$, $w_C$ and $w_D$ is one, such that the result of the weighted sum is properly normalised. It can also be seen that the predetermined weights are symmetric such that $w_A(u) \equiv (1-u)$ and $w_B(u) \equiv w_C(1-u)$. This symmetry allows the multiplexer 804 to be used as described above to swap the order of the data points if appropriate to thereby reduce the amount of hardware included in the P blend unit 806 and the Q blend unit 808.

The outputs of the P blend unit 806 and the Q blend unit 808 are the intermediate interpolated values 410 and 412 either side of the row component of the sampling position, e.g. the intermediate interpolated values for the interpolation positions $410_1$ and $412_1$ for the first row, either side of the position $406_1$, shown in FIG. 4b. The multiplexer 810 optionally reverses the order of the intermediate values 410 and 412 in accordance with the PQSwap signal (which equals the third bit of the U parameter, $u_2$). In this way, the intermediate interpolated value 410 is to the left of the row component of the sampling position 406 and the intermediate interpolated value 412 is to the right of the row component of the sampling position 406.

In an example in which the initial data array values are unsigned, k-bit values, it will be appreciated that the negative weights will require a sign bit to be included in any intermediate calculation. Furthermore, as individual weights can be greater than 1.0, an additional bit or bits may be required to cope with the dynamic range.

As an optimization to the method described above, the P and Q blend units 806 and 808 may add an offset to the weighted sum in order to ensure that the first and second intermediate interpolated values 410 and 412 are not negative, yet still fit within the increased number of bits that are included for allowing for the increased dynamic range. This offset can be removed in the column calculation units 704$_1$ and 704$_2$ before the surrounding interpolated values 414 are outputted from the bicubic interpolation unit 504. The addition of the offset means that the intermediate interpolated values 410 and 412 can be represented in an unsigned format (rather than a signed format) which reduces the number of bits used to represent each of the intermediate interpolated values 410 and 412 by one bit. Reducing the number of bits used for representing the intermediate interpolated values 410 and 412 means that the amount of data passed between the row calculation unit 702 and the column calculation units 704$_1$ and 704$_2$ is reduced. As the initial data values may be multi-channelled, e.g. image data with several colour channels, the elimination of a sign bit across the multiple channels, and MAD units can become a significant cost saving.

An example, which assumes 8-bit input, of the calculations that are performed by the P blend unit 806 can be summarised with the following pseudo code:

```
Input    unsigned A[7:0], B[7:0], C[7:0], D[7:0];
Input    unsigned P_Select[1:0];
Output   unsigned result[8:0];
IF P_Select[1]=="0" THEN
        unsigned OffsetToMakePositive = 32;
        result = B + OffsetToMakePositive;
ELSE
        unsigned OffsetToMakePositive = 32 << 5;
        unsigned RoundingValue         = 1 << 4;
        unsigned BTemp[12:0] = B * (P_Select[0]== "0" ? 28 : 18);
        unsigned CTemp[12:0] = C * (P_Select[0]== "0" ? 7 : 18);
        unsigned DTemp[ 8:0] = P_Select[0]== "0" ? D : 2*D;
        result = (BTemp + CTemp - 2*A - DTemp +
                  OffsetToMakePositive + RoundingValue) >> 5;
ENDIF;
```

The multiplication of B by 28 or 18 may be implemented as B*16+either [B*8+B*4] or [B*2]. Implementing the multiplication in this way is cheap in hardware because multiplication by powers of 2 can be implemented as binary shifts which are trivial to implement in hardware, such that this computation uses at most three additions and some trivial constant shifts. Similar factorisations may be used for this computation and for the other computations, e.g. the multiplication of C by 7 or 18 may be implemented as C*8+either [−C] or [C*8+C*2].

It is noted that in some examples, rather than calculating the intermediate values (e.g. BTemp, CTemp and DTemp) and then adding them together in a separate step to find a result as implied by the code above, the intermediate values might not be explicitly calculated and instead the result may be found directly by adding the appropriate values. For example, for u=218, with reference to Table 2 given above, the result could be found as:

result=(B*16+B*8+B*2+C*8−C−2*A−D+Offset+
            RoundingValue)>>5, such that the values of BTemp, CTemp and DTemp are not explicitly determined.

An example of the calculations that are performed by the Q blend unit 808 can be summarised with the following pseudo code:

```
Input unsigned A[7:0], B[7:0], C[7:0], D[7:0];
Input unsigned Q_Select[1];
Output unsigned result[8:0];
unsigned OffsetToMakePositive = 32 << 8;
unsigned RoundingValue        = 1 << 7;
unsigned ATemp[12:0] = A * (Q_Select[0]== "0" ? 12: 18);
unsigned BTemp[15:0] = B * (Q_Select[0]== "0" ? 247: 186);
unsigned CTemp[14:0] = C * (Q_Select[0]== "0" ? 23: 100);
unsigned DTemp[11:0] = D * (Q_Select[0]== "0" ? 2: 12);
result = (BTemp + CTemp - ATemp - DTemp +
                 OffsetToMakePositive + RoundingValue) >> 8;
```

As described above, a factorisation may be used for the computations of A, B, C and D, e.g. the multiplication of A by 12 or 18 may be implemented as A*16+either [−4" A] or [A*2]. Similarly to as described above, in some examples the values of ATemp, BTemp, CTemp and DTemp might not be explicitly determined and instead the value of the result may be determined by directly adding the appropriate values.

The first intermediate interpolated value 410 is provided to the first column calculation unit 704$_1$ and the second intermediate interpolated value 412 is provided to the second column calculation unit 704$_2$. One row of data is processed by the row calculation unit 702 on each of a plurality of clock cycles, such that the column calculation units 704 each receive an intermediate interpolated value (410 or 412) on each of the clock cycles.

In step S606$_1$ the first column calculation unit 704$_1$ multiplies the first intermediate interpolated values 410 received from the row calculation unit 702 on each clock cycle by weights according to the current row number and accumulates the results. Similarly, and in parallel, in step S606$_2$ the second column calculation unit 704$_2$ multiplies the second intermediate interpolated values 412 received from the row calculation unit 702 on each clock cycle by weights according to the current row number and accumulates the results. After four clock cycles, the column calculation units 704 have each received four intermediate interpolated values and have each determined two interpolated values (414) either side of a column component (416) of the sampling position (408) indicated by the V parameter.

Figure 9:
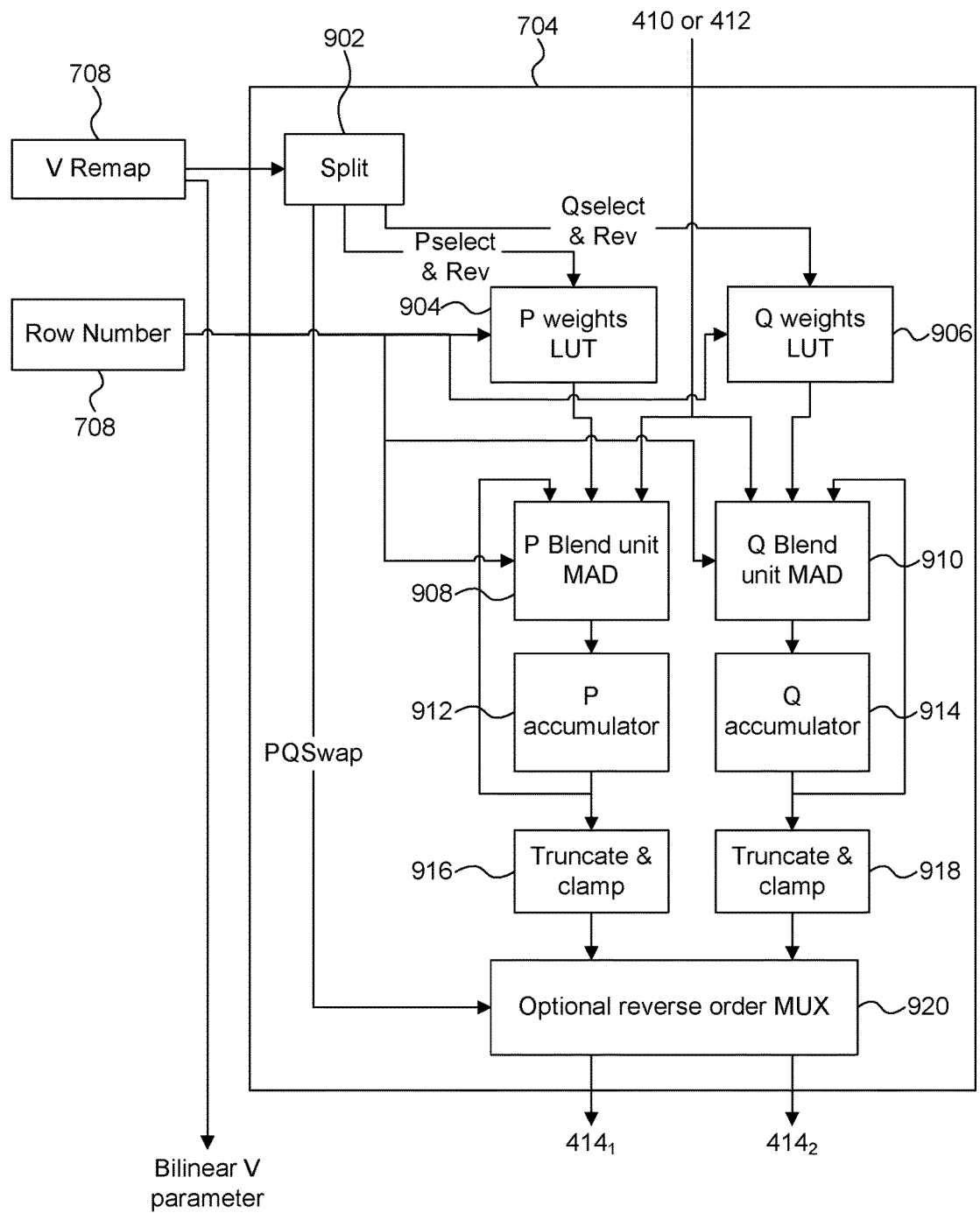
FIG. 9 is a schematic diagram of a column calculation unit.

FIG. 9 shows a more detailed view of one of the column calculation units 704. Both of the column calculation units 704 operate in a corresponding manner, as described with reference to FIG. 9. As shown in FIG. 9, the column calculation unit 704 comprises a splitting unit 902, a P weights look up table (LUT) 904, a Q weights LUT 906, a P blend multiply and add (MAD) unit 908, a Q blend MAD unit 910, a P accumulator 912, a Q accumulator 914, two truncate and clamp units 916 and 918 and a multiplexer 920.

The V remapping unit 708 provides a plurality of bits to the splitting unit 902 based on the bits of the V parameter. For example, the V parameter which describes the column component of the sampling position, may comprise k bits, $\{v_0, v_1 \ldots v_{k-1}\}$, where as an example k may be eleven. The number of bits used for the V parameter determines the resolution at which the sampling position can be defined. The V remapping unit 708 receives the k bits of the V parameter and splits the V parameter into the first m bits which are for use in the column calculation unit 704 and the remaining (k-m) bits are provided from the V remapping unit 708 to indicate a bilinear V parameter. The bilinear interpolation unit 506 uses the bilinear V parameter to perform the bilinear interpolation on the four surrounding interpolated values outputted from the bicubic interpolation unit 504. As an example, m may be three, and those three bits of the V parameter identify which eighth of the whole region between two data points on the middle two of the four rows of data points the sampling position is within. In a similar manner to the U remapping unit 706 described above, the V remapping unit 708 determines four control signals: "Rev", "PSelect", "QSelect" and "PQSwap" which control the operation of the column calculation unit 702, and these four control signals are passed to the splitting unit 902. Therefore, in an example in which m=3, the Rev, QSelect and PQSwap signals each have one bit and the PSelect signal has two bits. The splitting unit 902 passes the PSelect and the Rev signal to the P blend MAD unit 908, passes the QSelect and the Rev signal to the Q blend MAD unit 910 and passes the PQSwap signal to the multiplexer 920.

On each clock cycle, an intermediate interpolated value (410 or 412) is received at the column calculation unit 704 and passed to both the P blend MAD unit 908 and the Q blend MAD unit 910. The row number unit 708 provides an indication of the current row corresponding to the intermediate interpolated value that is received in the current clock cycle. The indication of the current row is passed to the P weights LUT 904, the Q weights LUT 906, the P blend MAD unit 908 and the Q blend MAD unit 910.

The P weights LUT 904 determines a weight to be applied to the intermediate interpolated value by the P blend MAD unit 908 on a current cycle in dependence on the PSelect and Rev signals and in dependence on the current row number. The weights are determined in the same manner as for the rows of data points, e.g. in accordance with a Catmull-Rom interpolation using the weights shown in Table 2 above, wherein the intermediate interpolated value (410$_1$ or 412$_1$) on the first row corresponds to data point A; the intermediate interpolated value (410$_2$ or 412$_2$) on the second row corresponds to data point B; the intermediate interpolated value (410$_3$ or 412$_3$) on the third row corresponds to data point C; and the intermediate interpolated value (410$_4$ or 412$_4$) on the fourth row corresponds to data point D.

An example of the how a weight is determined by the P weights LUT 904 is shown with the following pseudo code:

```
Input unsigned PSelect[1:0], Rev[1], RowNum[1:0];
Output signed  Result[6:0];
const signed Weights[4][2][5:0]=
{
    {-2, -2},
    {28, 18},
    { 7, 18},
    {-1, -2}
};
//Flip row order if necessary. Eg 3=>0, 2=>1 etc
RowNum = RowNum XOR (Rev[0] & Rev[0]);
// if corner case, only use the value from the second row.
IF PSelect[1]== "0" THEN
  Result = (RowNum == "01") ? 32 : 0;
//Else look the result up in the 2D array
```

```
//(sign extended from 5 to 6 bits)
ELSE
  Result = Weights[RowNum][PSelect[0]];
ENDIF
```

Similarly, the Q weights LUT 906 determines a weight to be applied to the intermediate interpolated value by the Q blend MAD unit 910 on a current cycle in dependence on the QSelect and Rev signals and in dependence on the current row number. An example of the how a weight is determined by the Q weights LUT 906 is shown with the following pseudo code:

```
Input unsigned QSelect[1], Rev[1], RowNum[1:0];
Output signed Result[9:0];
const signed Weights[4][2][9:0]=
{
    {-12,-18},
    {247,186},
    { 23,100},
    { -2,-12}
};
//Flip row order if necessary. Eg 3=>0, 2=>1 etc
RowNum = RowNum XOR (Rev[0] & Rev[0]);
//look the result up in the 2D array
Result = Weights[RowNum][QSelect[0]];
```

The P blend MAD unit 908 receives the intermediate interpolated value (410 or 412) for the current row, the weight from the P weights LUT 904, the value currently stored in the P accumulator 912 and the indication of the current row number from the row number unit 708. The P blend MAD unit 908 multiplies the intermediate interpolated value (410 or 412) for the current row by the weight from the P weights LUT 904, and adds this weighted value to the value currently in the P accumulator 912. The result is written back out to the P accumulator 912. If the current row is the first row of a group of rows over which an interpolation is being performed then the P accumulator 912 does not store relevant results from previous rows so the current value of the P accumulator 912 is not added to the result of multiplying the intermediate interpolated value (410 or 412) for the current row by the weight from the P weights LUT 904 before the result is written out to the P accumulator 912. In preferred examples, some rounding is performed to give the desired results with the minimum number of intermediate fractional bits. That is, each multiply operation is rounded to 2 fractional bits of precision but instead of adding 0.5 (relative to the least significant stored bit) 0.25 is added, and furthermore on the final multiply-add operation, 0.5 is added relative to the truncations performed in the truncate and clamp unit 916. An example of the operation of the P blend MAD unit 908 is shown with the following pseudo code:

```
//
// In these P unit multiplies, we assume 5 fractional bits
// of precision but then only retain 2 for the summation
//
Input   unsigned ColumnVal[8:0];
Input   signed Weight[6:0], AccIn[11:0];
Input   unsigned Row[1:0];
Output signed AccResult[11:0];
unsigned IsRowZero[1] = (Row=="00");
//Add accum except on row 0 when we remove the offset that was
//applied in the row unit.
```

```
//
//Also on Row 0 we create the truncate rounding value - this is done only
once. The
//multiply has 5 fractional bits so the rounding spot is 1<<4
//
signed ShiftedAccIn[14:0] = IsRowZero[0] ? (−32 << 5) + 1<<4 : (AccIn
<< 3);
// Do the multiply with the adjusted rounding for the required number
// of intermediate bits
signed TempResult[14:0] = Weight * ColumnVal + 2 + ShiftedAccIn;
// Remove excess fractional bits.
AccResult = TempResult >> (5−2);
```

Due to the limited ranges of input values, the "TempResult" value is constrained to be in the range [−2272, 10448] and so does fit into an S15 value, such that the accumulated result (AccResult) fits into an S12 value.

Similarly, the Q blend MAD unit 910 has the same basic structure but with slightly wider intermediate values. Therefore, the Q blend MAD unit 910 receives the intermediate interpolated value (410 or 412) for the current row, the weight from the Q weights LUT 906, the value currently stored in the Q accumulator 914 and the indication of the current row number from the row number unit 708. The Q blend MAD unit 910 multiplies the intermediate interpolated value (410 or 412) for the current row by the weight from the Q weights LUT 906, and adds this weighted value to the value currently in the Q accumulator 914. The result is written back to the Q accumulator 914. If the current row is the first row of a group of rows over which an interpolation is being performed then the Q accumulator 914 does not store relevant results from previous rows so the current value of the Q accumulator 914 is not added to the result of multiplying the intermediate interpolated value (410 or 412) for the current row by the weight from the Q weights LUT 906 before the result is written out to the Q accumulator 914. As described above, in preferred examples, some rounding is performed to give the desired results with the minimum number of intermediate fractional bits. An example of the operation of the Q blend MAD unit 910 is shown with the following pseudo code:

```
//
// In these Q unit multiplies, we assume 8 fractional bits
// of precision but then only retain 2 for the summation. This is for cost
reduction, but in
// other examples, a full precision accumulated value could, instead, be
maintained.
//
Input unsigned ColumnVal[8:0];
Input signed AccIn[11:0], Weight[9:0];
Input  unsigned Row[1:0];
Output signed AccResult[11:0];
unsigned IsRowZero[1] = (Row=="00");
//Add accum except on row 0 when we remove the offset that was
//applied in the row unit.
//Also, on Row 0 we create the truncate rounding value - this is
//done only once.
signed ShiftedAccIn[17:0] = IsRowZero[0] ? (−32<<8) + 1<<7 :
                                           (AccIn << 6);
// Do the multiply with the adjusted rounding for the required number
// of intermediate bits
signed TempResult[17:0] = Weight * ColumnVal + 16 + ShiftedAccIn;
// Sum everything and remove excess bits.
AccResult = TempResult >> (8−2);
```

Due to the limited ranges of input values, the "TempResult" value is constrained to be in the range [−17540, 82948] and so does fit into an S18 value, such that the accumulated result (AccResult) fits into an S12 value.

The P and Q accumulator units (912 and 914) in the example described above are 12-bit registers that store the S12 results outputted from the P and Q blend MAD units 908 and 910 respectively.

In step S608, when four rows of values have been accumulated in the P and Q accumulators (912 and 914) then the values in the P and Q accumulators represent the two surrounding interpolated values either side of the column component of the sampling position 416 indicated by the V parameter, and these accumulated values are outputted from the column calculation units 704. The two surrounding interpolated values are determined at the closest two of the predetermined interpolation positions. However, in an example, before the accumulated values are outputted from the column calculation unit 704, the truncate and clamp units 916 and 918 truncate and clamp the twelve-bit signed accumulated values from the respective accumulators 912 and 914 to thereby convert the accumulated values to eight-bit unsigned values. This is done to constrain the interpolated values to the original range, and in some examples this might not be necessary. For example, the operation of each of the truncate and clamp units 916 and 918 may be summarised by the following pseudo code:

```
Input signed AccVal[11:0]
Output unsigned TruncatedAndClamped[7:0];
IF AccVal[11]=='1' THEN
    TruncatedAndClamped = 0;
ELIF AccVal[10]== '1'
    TruncatedAndClamped = 255;
ELSE
    TruncatedAndClamped = AccVal[9:2];
ENDIF
```

The outputs of the truncate and clamp units 916 and 918 from one of the column calculation units 704 are the surrounding interpolated values 414 for a column either side of the column component of the sampling position. For example, in the first column calculation unit 704$_1$ the outputs of the truncate and clamp units 916 and 918 represent the surrounding interpolated values 414$_{11}$ and 414$_{21}$ (as shown in FIG. 4b), either side of the position 416$_1$. Similarly, as an example, in the second column calculation unit 704$_2$ the outputs of the truncate and clamp units 916 and 918 represent the surrounding interpolated values 414$_{12}$ and 414$_{22}$ (as shown in FIG. 4b), either side of the position 416$_2$. In each of the column calculation units 704, the multiplexer 920 optionally reverses the order of the surrounding interpolated values 414 in accordance with the PQSwap signal (which equals the third bit of the V parameter, $v_2$). In this way, the first surrounding interpolated value 414$_1$ is above the column component of the sampling position 416 and the second surrounding interpolated value 414$_2$ is below the column component of the sampling position 416. For example, the operation of the multiplexer 920 may be given by the following pseudo code:

```
Input unsigned InP[7:0], InQ[7:0], PQSwap[1];
Output unsigned Out1[7:0], Out2[7:0];
IF PQSwap[0] THEN
    Out1 = InQ;
    Out2 = InP;
ELSE
    Out1 = InP;
    Out2 = InQ;
ENDIF
```

The four surrounding interpolated values $414_{11}$, $414_{12}$, $414_{21}$ and $414_{22}$ are outputted from the bicubic interpolation unit 504 and passed to the bilinear interpolation unit 506. Furthermore, the bilinear U parameter and the bilinear V parameter are passed from the bicubic interpolation unit 504 to the bilinear interpolation unit 506. In step S610 the bilinear interpolation unit 504 performs a bilinear interpolation on the surrounding interpolated values $414_{11}$, $414_{12}$, $414_{21}$ and $414_{22}$ using the bilinear U and V parameters which indicates the sampling position 408 between the surrounding interpolated values. In this way an interpolated value is determined. The interpolated value is outputted from the interpolation logic 502 and represents the result of the interpolation.

It can be appreciated that the result of the bilinear interpolation on the surrounding interpolated values $414_{11}$, $414_{12}$, $414_{21}$ and $414_{22}$ will provide an interpolated value that is closer to a full bicubic interpolation than if a bilinear interpolation were performed on the data points $404_{22}$, $404_{23}$, $404_{32}$ and $404_{33}$. In this sense the interpolation logic 502 provides smoother interpolated values than if just a bilinear interpolation unit were used. However, the interpolation logic 502 is much simpler to implement in hardware than a full bicubic interpolation unit because the interpolation logic 502 performs weighted sums rather than relatively complex third degree polynomial calculations.

In the examples described above, the surrounding interpolated values 414 are the closest of the predetermined interpolation positions to the sampling position 408. In other examples, it would be possible (although it is unlikely to be preferable) to choose surrounding interpolated values which are not the closest of the predetermined interpolation positions to the sampling position. In these other examples, the final interpolated value is likely to be further from the result of performing a full bicubic interpolation.

The examples described above include a bicubic interpolation unit 504 and a bilinear interpolation unit 506. In other examples, the interpolation unit 504 could be any type of interpolation unit other than a linear interpolation unit, i.e. a "not linear" interpolation unit. That is, generally, the interpolation unit 504 is a not linear interpolation unit configured to perform some sort of not linear interpolation. The term "not linear interpolation" is used herein to refer to interpolation other than linear interpolation, i.e. any interpolation which is not linear, and may for example be a polynomial interpolation, cubic or higher order interpolation, Mitchell-Netravali or other non-polynomial interpolation, or any other suitable interpolation. The interpolation logic 502 operates to approximate the not linear interpolation without requiring the full not linear interpolation calculations to be performed.

In the examples shown in FIGS. 4a and 4b there are eight predetermined interpolation positions between two adjacent data points in one dimension. In other examples, there may be a different number (e.g. 2, 4, 10 or 16) of predetermined interpolation positions between two adjacent data points in one dimension. The predetermined interpolation positions are preferably regularly spaced between adjacent data points as in the examples described above, but in some examples it would be possible for the predetermined interpolation positions to be irregularly spaced between adjacent data points.

As shown in FIG. 5 and described above, the interpolation logic 502 comprises a not linear interpolation unit (e.g. the bicubic interpolation unit 504) and a linear interpolation unit (e.g. the bilinear interpolation unit 506). The not linear interpolation unit and the linear interpolation unit could be implemented in the same interpolation module or they could be implemented in separate modules within a computer system wherein communication between the not linear interpolation unit and the linear interpolation unit may be via interfaces allowing data to be passed between the different modules within the computer system.

In the examples described above one of the four rows of the 4×4 set of data points is processed on each of a plurality of clock cycles. However, in other examples, some of the processing may be performed in parallel. For example, more than one of the four rows of the 4×4 set of data points may be processed in parallel. Increasing the parallelisation of the processing can increase the performance (e.g. speed) of the system.

The methods described above with reference to FIGS. 5 to 9 relate to interpolation within a 2D array of data points. Corresponding principles can be applied to interpolation within an n-dimensional array where $n \geq 1$. For example, for interpolation within a 3D array of data points, the interpolation logic may include: (i) a tricubic interpolation unit configured to determine eight surrounding interpolated values at the eight closest predetermined interpolation positions to a sampling position; and (ii) a trilinear interpolation unit configured to perform trilinear interpolation on the eight surrounding interpolated values to determine the interpolated value.

In the examples described above, an array of data is processed in rows first and then columns. It would be apparent to those skilled in the art that the same techniques could be applied to process an array of data in columns first and then in rows. That is, the processing of rows and columns could be swapped in the examples described above.

The interpolation methods described herein may be used for any suitable interpolation. For example, the data points in the array may be texels of a texture wherein an interpolated value represents a texture value at a sampling position. Alternatively, the data points in the array may be pixels of an image wherein an interpolated value represents an image value at a sampling position, which could be useful for image processing functions such as image scaling or lens aberration correction. More broadly, the data points may be any type of graphical data. More broadly still, in other examples, the data points may represent height, temperature, density or electrical field, or any other appropriate quantity.

The values and data points are described in the examples above as being in fixed point format. In general, any suitable format may be used and, for example, the values and/or data points may be represented as floating point numbers in some examples.

Figure 10:
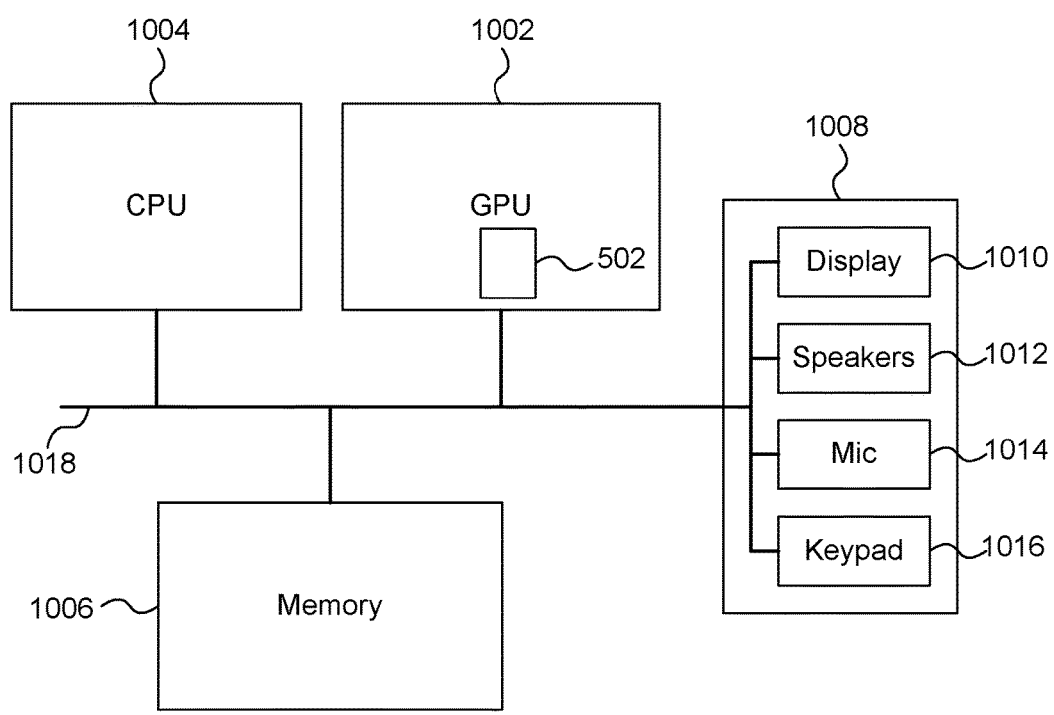
FIG. 10 is a schematic diagram of a computer system in which interpolation logic is implemented.

The interpolation logic 502 described above can be implemented in a computer system. For example, FIG. 10 shows a computer system which comprises a GPU 1002, a CPU 1004, a memory 1006 and other devices 1008, such as a display 1010, speakers 1012, a microphone 1014 and a keypad 1016. The components of the computer system can communicate with each other via a communications bus 1018. The interpolation logic 502 may be implemented (e.g. in hardware) as part of the GPU 1002 as shown in FIG. 10. Alternatively, the interpolation logic may be implemented on the CPU 1004. If the interpolation logic 502 is implemented in software then it may be stored as computer program code in the memory 1006 and may be executed on a processing unit in the computer system (e.g. on the GPU 1002 or the CPU 1004).

Generally, any of the functions, methods, techniques or components described above (e.g. the interpolation logic 502 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs or GPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the interpolation logic 502 and its components) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the interpolation logic 502 and its components) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic described above, such as HDL (hardware description language) software, as is used for designing integrated circuits, or for configuring programmable chips, to carry out desired functions. That is, there may be provided a computer readable storage medium having encoded thereon computer readable program code for generating interpolation logic configured to perform any of the methods described herein, or for generating interpolation logic comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate interpolation as described herein. To put it another way, there may be provided a non-transitory computer readable storage medium having stored thereon computer readable instructions that, when processed at a computer system for generating a manifestation of an integrated circuit, cause the computer system to generate a manifestation of interpolation logic according to any of the examples described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. Interpolation logic comprising:
fixed-function multiplier logic configured in hardware circuitry to determine an interpolated value at one or more pre-determined interpolation positions (U) within an array of data points by performing a weighted sum according to:

$$w_A(U)A+w_B(U)B+w_C(U)C+w_D(U)D$$

where A, B, C and D are four data points of a line in the array of data points and $w_A$, $w_B$, $w_C$, and $w_D$ are their corresponding weights, wherein the weights are set in the fixed-function multiplier logic to provide an imperfect representation of a Catmull-Rom interpolation to thereby simplify the hardware circuitry of the fixed-function multiplier logic compared to providing a perfect representation of the Catmull-Rom interpolation.

2. The interpolation logic of claim 1 wherein there are nine pre-determined interpolation positions: U=0, U=1/8, U=2/8, U=3/8, U=4/8, U=5/8, U=6/8, U=7/8 and U=8/8.

3. The interpolation logic of claim 2 wherein the weights for the pre-determined interpolation positions U=2/8, U=4/8 and U=6/8 all have a first denominator which is a first power of two, and wherein the weights for the pre-determined interpolation positions U=1/8, U=3/8, U=5/8 and U=7/8 all have a second denominator which is a second power of two.

4. The interpolation logic of claim 3 wherein the first denominator is 32 and the second denominator is 256.

5. The interpolation logic of claim 3 wherein the fixed-function hardware multiplier logic is configured to:
implement the division by the first denominator as a binary shift by a first number of binary places; and
implement the division by the second denominator as a binary shift by a second number of binary places.

6. The interpolation logic of claim 5 wherein the first denominator is 32 and the second denominator is 256, and wherein the first number of binary places is five and the second number of binary places is eight.

7. The interpolation logic of claim 2 wherein the weights for the pre-determined interpolation positions (U) are given by:

| U | $w_A$ | $w_B$ | $w_C$ | $w_D$ |
|---|---|---|---|---|
| 0 | 0 | 1 | 0 | 0 |
| 1/8 | −12/256 | 247/256 | 23/256 | −2/256 |
| 2/8 | −2/32 | 28/32 | 7/32 | −1/32 |
| 3/8 | −18/256 | 186/256 | 100/256 | −12/256 |
| 4/8 | −2/32 | 18/32 | 18/32 | −2/32 |
| 5/8 | −12/256 | 100/256 | 186/256 | −18/256 |
| 6/8 | −1/32 | 7/32 | 28/32 | −2/32 |
| 7/8 | −2/256 | 23/256 | 247/256 | −12/256 |
| 8/8 | 0 | 0 | 1 | 0. |

8. The interpolation logic of claim 1 wherein for each of the one or more predetermined interpolation positions (U) the sum of the predetermined weights $w_A$, $w_B$, $w_C$ and $w_D$ is one, and wherein the predetermined weights are symmetric such that $w_A(U) \equiv w_D(1-U)$ and $w_B(U) \equiv w_C(1-U)$.

9. The interpolation logic of claim 1 wherein the fixed-function multiplier logic comprises multiply and add (MAD) logic implemented in hardware and arranged to perform the weighted sum.

10. The interpolation logic of claim 1 wherein the array is an n-dimensional array, wherein n≥1.

11. The interpolation logic of claim 1 wherein the data points in the array are graphical data points.

12. The interpolation logic of claim 11 wherein the data points in the array are texels of a texture.

13. A method of determining an interpolated value using fixed-function multiplier logic configured in hardware circuitry to determine an interpolated value at one or more pre-determined interpolation positions (U) within an array of data points, the method comprising:
using the fixed-function multiplier logic to perform a weighted sum according to:

$$w_A(U)A + w_B(U)B + w_C(U)C + w_D(U)D$$

where A, B, C and D are four data points of a line in the array of data points and $w_A$, $w_B$, $w_C$ and $w_D$ are their corresponding weights, wherein the weights are set in the fixed-function multiplier logic to provide an imperfect representation of a Catmull-Rom interpolation to thereby simplify the hardware circuitry of the fixed-function multiplier logic compared to providing a perfect representation of the Catmull-Rom interpolation.

14. A non-transitory computer readable storage medium having stored thereon a computer readable description of interpolation logic circuitry that, when processed, configures a system for generating the interpolation logic circuitry, wherein the interpolation logic circuitry comprises:
fixed-function multiplier logic configured in hardware circuitry to determine an interpolated value at one or more pre-determined interpolation positions (U) within an array of data points by performing a weighted sum according to:

$$w_A(U)A + w_B(U)B + w_C(U)C + w_D(U)D$$

where A, B, C and D are four data points of a line in the array of data points and $w_A$, $w_B$, $w_C$ and $w_D$ are their corresponding weights, wherein the weights are set in the fixed-function multiplier logic to provide an imperfect representation of a Catmull-Rom interpolation to thereby simplify the hardware circuitry of the fixed-function multiplier logic compared to providing a perfect representation of the Catmull-Rom interpolation.

15. The non-transitory computer readable storage medium of claim 14 wherein the fixed-function multiplier logic has nine pre-determined interpolation positions: U=0, U=1/8, U=2/8, U=3/8, U=4/8, U=5/8, U=6/8, U=7/8 and U=8/8.

16. The non-transitory computer readable storage medium of claim 15 wherein the weights for the pre-determined interpolation positions U=2/8, U=4/8 and U=6/8 all have a first denominator which is a first power of two, and wherein the weights for the pre-determined interpolation positions U=1/8, U=3/8, U=5/8 and U=7/8 all have a second denominator which is a second power of two.

17. The non-transitory computer readable storage medium of claim 16 wherein the fixed-function hardware multiplier logic is configured to:
implement the division by the first denominator as a binary shift by a first number of binary places; and
implement the division by the second denominator as a binary shift by a second number of binary places.

18. The non-transitory computer readable storage medium of claim 17 wherein the first denominator is 32 and the second denominator is 256, and wherein the first number of binary places is five and the second number of binary places is eight.

19. The non-transitory computer readable storage medium of claim 15 wherein the weights for the pre-determined interpolation positions (U) are given by:

| U | $w_A$ | $w_B$ | $w_C$ | $w_D$ |
|---|---|---|---|---|
| 0 | 0 | 1 | 0 | 0 |
| 1/8 | −12/256 | 247/256 | 23/256 | −2/256 |
| 2/8 | −2/32 | 28/32 | 7/32 | −1/32 |
| 3/8 | −18/256 | 186/256 | 100/256 | −12/256 |
| 4/8 | −2/32 | 18/32 | 18/32 | −2/32 |
| 5/8 | −12/256 | 100/256 | 186/256 | −18/256 |
| 6/8 | −1/32 | 7/32 | 28/32 | −2/32 |
| 7/8 | −2/256 | 23/256 | 247/256 | −12/256 |
| 8/8 | 0 | 0 | 1 | 0. |

20. The non-transitory computer readable storage medium of claim 14 wherein the fixed-function multiplier logic comprises multiply and add (MAD) logic implemented in hardware and arranged to perform the weighted sum.

* * * * *